2,947,614

METHOD OF MAKING INSOLUBLE SULPHUR

Ernst Julius Manthey, Essen, Germany, assignor to Ruhrgas Aktiengesellschaft, Essen, Germany No Drawing. Filed Apr. 11, 1957, Ser. No. 652,111

Claims priority, application Germany Mar. 13, 1954

7 Claims. (Cl. 23—312)

The present invention relates to a method of making insoluble sulphur and, more particularly, to a method of making stabilized high grade insoluble sulphur. This application is a continuation-in-part application of my co-pending patent application Ser. No. 492,791, filed Mar. 7, 1955, now abandoned.

As is well known, ordinary sulphur consists of two modifications namely a soluble sulphur ($\lambda$ sulphur) and an insoluble sulphur ($\mu$-sulphur). It is known to extract sulphur by means of appropriate solvents, i.e. the soluble sulphur ($S\lambda$) is dissolved and the insoluble sulphur ($S\mu$) is obtained as residue. The dried residue is for instance a very desired raw material in the rubber industry.

From the quantitative proportions of soluble sulphur and of insoluble sulphur an equilibrium establishes itself. The quantitative ratio of soluble to insoluble sulphur is among other factors dependent on the temperature of the sulphur. With increasing temperature the proportion of soluble sulphur decreases and the proportion of insoluble sulphur increases. It is known to heat sulphur, suddenly to cool or quench the sulphur in its liquid or vaporized condition, and to extract the cooled sulphur. The quantity of insoluble sulphur obtained in this way depends among other factors on the temperature to which the sulphur was heated previously.

It is further known, by adding catalysts (for instance olefin sulphur compounds, trithione), to the sulphur prior to the melting thereof and/or to the molten sulphur, to accelerate the establishment of an equilibrium between the soluble and insoluble sulphur in the sulphur melt. It is also known, by adding inhibitors (such as halogens, halogen sulphur compounds) to retard the establishment of said equilibrium in the melt as well as to retard the return of the equilibrium of soluble and insoluble sulphur in the sulphur melt to an unbalance during the cooling off of the melt. Finally it is also known by adding inhibitors (such as halogens, halogen sulphur compounds) to retard the regeneration of the insoluble sulphur obtained as residue during the extraction of the chilled sulphur melt to soluble sulphur.

However, the insoluble sulphur produced according to the heretofore known methods partly transforms again into soluble sulphur when stored over a longer and sometimes also over a short period of time. In an effort to overcome the above mentioned drawback, applicant has found that the addition of catalysts to the sulphur and/or the sulphur melt, as is customary with the heretofore known methods of making an insoluble sulphur, is harmful inasmuch as these catalysts further not only the fast establishment of the equilibrium in the melt but also the reestablishment of the equilibrium in the cooled-off sulphur and in the insoluble sulphur obtained during the extraction, in other words the re-formation of the insoluble sulphur to soluble sulphur, thereby considerably reducing the storability of the obtained insoluble sulphur.

Applicant has furthermore found that sulphur, even pure sulphur, obtained according to the heretofore known methods still contains traces of catalysts which are sufficient during a longer heating period to establish the equilibrium between soluble and insoluble sulphur at a satisfactory speed so that the heretofore practiced addition of catalysts in connection with the method of producing insoluble sulphur can be abandoned.

It is known that especially metal salts or metal sulphur compounds, for instance of iron, greatly affect the storability of the insoluble sulphur although, when present during the heating of the sulphur, they accelerate the establishment of the equilibrium.

Applicant has furthermore found that metals, metal compounds or traces thereof absorbed by the sulphur in the heating vessel reduce the storability of the produced insoluble sulphur. This is due not only to the presence itself of said metals or metal compounds but especially due to the fact that due to said metals, metal compounds or traces thereof, which are present even in chemically pure sulphur, side reactions are initiated by the inhibitors added prior or during the heating in the heating vessel. These side reactions reduce the storability of the insoluble sulphur and also considerably reduce the yield of insoluble sulphur during the extraction. This is due to the fact that the plastic sulphur obtained by the quenching of the sulphur melt, during its storage until solidification and up to the extraction encounters a remarkable change as a considerable quantity of insoluble sulphur is transformed back to soluble sulphur. This may go so far that the cooled-off melt after a storage of a few days for purposes of solidification contains only minute proportions, i.e. 3% by weight of insoluble sulphur, or that while a good yield in insoluble sulphur is obtained, this yield within a relatively short time re-forms considerable quantities of soluble sulphur which excludes the applicability of said sulphur.

It is, therefore, an object of this invention to provide a method of making stabilized high grade insoluble sulphur which will be characterized by high purity and long storability.

It is another object of this invention to provide an improved method of making stabilized high grade insoluble sulphur, which will make the heretofore necessary voluminous adsorbing installations superfluous.

Still another object of this invention consists in the provision of an improved method of the above type, which when employing carbon disulfide as solvent will not require any vacuum.

These and other objects and advantages of the invention will appear more clearly from the following specification.

The present invention which, as stated above concerns a method of making insoluble sulphur, is characterized by the combination of some known steps with some new steps whereby a stabilized high grade insoluble sulphur is obtained which has an extremely high purity and storability never before realized. As far as the known steps above referred to in general are concerned, the same consist in detail in the following:

I. Heating of sulphur to temperatures above its melting point but below its temperature of evaporation.

II. Adding to the sulphur melt any inhibitor which impairs the insoluble sulphur in its tendency to become soluble again.

III. Cooling the melt so that a solid mass will form again.

IV. Extracting the soluble sulphur from the cooled mass by an appropriate solvent.

V. Separating the residue, i.e. the insoluble sulphur, from the solvent.

The new steps in conformity with the present invention will now be set forth. As has been brought out in the introductory portion of the specification, the ratio of soluble to insoluble sulphur depends among other factors on the temperature, and the share of insoluble sulphur increases with increasing temperature. In view of applicant's finding referred to above that the addition of a catalyst as heretofore used for accelerating the establishment of the equilibrium between soluble and insoluble sulphur in the sulphur melt, not only accelerates the establishment of said equilibrium but increases the share of insoluble sulphur and causes the insoluble sulphur to be converted back into soluble sulphur, the first characterizing feature of the method according to the invention consists in that (a) The heating of the sulphur is effected without the addition of any catalyst.

Care is even to be taken that such catalysts will not form during the heating. As catalysts particularly metallic salts or metal sulphur compounds would be effective. The invention furthermore comprises the following new features:

(b) The heating of the sulphur and the addition and intermixing of the inhibitor which prevents the re-formation of insoluble sulphur to soluble sulphur is effected in separate vessels which do not give off metal or metal compounds or even traces thereof as for instance iron. Such vessels may, for instance, consist or have a surface of corrosion-resistant material such as chromium-nickel-steel.

A third feature according to the present invention consists in that—

(c) The longer heating operation of the sulphur is carried out in a first vessel and the addition and mixture of the inhibitor with the sulphur melt is carried out in a separate second vessel in which the sulphur and inhibitor remain for a brief period only, i.e. for only a few seconds up to a few minutes for instance from 20 seconds to 10 minutes, whereupon the sulphur melt is quenched immediately.

In order during the heating operation to prevent the formation of sulphur dioxide which brings about a retardation in the establishment of the equilibrium in the melt, the heating is preferably effected in an atmosphere of inert gases such as $CO_2$ or nitrogen. In this way, it will also be avoided that the vessels will be attacked by $SO_2$ vapors.

It has furthermore been found of extreme importance to extend the duration or the temperature of the heating only so far that after the cooling-off period only a proportion of from 35 to 45% by weight, preferably from 37 to 42%, of insoluble sulphur is contained in the sulphur melt containing the inhibitor. This percentage is easily ascertained by testing and examination. Inasmuch as the re-formation of insoluble sulphur to soluble sulphur during the short time during which the inhibitor is added and during the quick cooling of the melt is in most instances completely irrelevant, it is sufficient to effect the heating over such period and at such temperature that in the heating vessel 35 to 45% by weight, preferably 37 to 42%, of insoluble sulphur are in equilibrium with soluble sulphur. A smaller content in insoluble sulphur will, following the storing of the plastic sulphur for solidification thereof, bring about an insoluble sulphur which during the extraction suffers a collapse of its structure and therefore is retained in the extractor as mud from which the solvent can be removed only under great difficulties. A higher content in insoluble sulphur which could easily be obtained by a longer heating period and higher temperature has proved similarly harmful. While during the extraction grains of too great solidity or density remain, these grains cannot be extracted very well because the great proportion of insoluble sulphur frequently hampers the access of the solvent to the soluble sulphur. Thus even after a longer period of extraction an insoluble sulphur is obtained which has a content in soluble sulphur considerably higher than about 2 to 8% and consequently has a reduced storability because the soluble sulphur retained in the insoluble sulphur favors the re-formation.

In addition to the method of freezing the equilibrium between the insoluble and soluble sulphur obtained in the sulphur melt by chilling the melt in a water bath, it is also known by means of vaporous or liquid carbon disulfide to cool highly heated sulphur vapors to a temperature below 60° C.

It has been found that to prevent a re-formation of insoluble sulphur to soluble sulphur, the employment of said upper temperature limit is also of great importance for the further treatment up to the finished product of the mixture of soluble and insoluble sulphur obtained from the heated sulphur melt by addition of inhibitors and the chilling step.

Therefore, not only is the chilling of the sulphur melt effected to a temperature of below 60° C., but also the further treatment of the chilled sulphur melt comprising an inhibitor, and the extraction are effected at temperatures below 60° C. The plastic sulphur obtained by the chilling operation solidifies after some storing which has to be effected at a temperature of below 60° C. This storing may under the given temperature condition also be used for a pre-drying operation. Furthermore, the solid sulphur is crushed to such an extent that local temperatures higher than 60° C. will be avoided.

Following the extraction, the insoluble sulphur must be freed from solvents. A number of methods are known for this purpose, however, the following new method according to the invention has proved most advantageous. After releasing the solvent, which preferably consists of carbon disulfide, warm water is slowly filled into the extractor from below so that the extraction residue will gradually be flooded by the warm water. At the same time, by appropriate means, for instance by screens, care is taken that the extraction residue will not float on the water. Due to the heat of the warm water, the residues of the solvent are evaporated gradually, and simultaneously the vapors are mechanically pushed out of the extraction residue by the water. Warm water is introduced only until the water has reached the surface of the extraction residue. Subsequently the warm water is withdrawn again from below. By one or more repetitions of this treatment, also the last residues of the solvent are easily removed. The particular advantage of this method consists in that voluminous absorption devices as they are necessary for instance when removing the solvent by inert gases, and also the employment of a vacuum with the inherent danger of drawing in air and forming explosive gas mixtures will be avoided. The drying of the wet insoluble sulphur is effected in a manner known per se and likewise at a temperature of below 60° C. so that the formation of explosive gas mixtures will be excluded.

When employing solvents other than carbon disulfide, e.g. perchloroethylene or carbon tetrachloride, the boiling temperature of which lies above 60° C., such a vacuum has to be employed that the solvent will vaporize at the temperature of the added hot water. With the last two solvents, the danger that an explosive mixture might form, does not exist. Consequently, it is not necessary to avoid a vacuum. Also in this instance the particular advantage is obtained that voluminous adsorbing installations as they are necessary when removing solvents by means of inert gases, become superfluous.

The method according to the invention of displacing the extraction residues from the insoluble sulphur is of advantage also when making insoluble sulphur from a sulphur melt in a heretofore known manner because it increases the yield and degree of purity of the final product. In connection with the described way of heating and stabilizing of the sulphur, an insoluble sulphur is obtained which additionally is characterized by a high storability with a content of 92 to 98% by weight of insoluble sulphur. There will now be set forth a specific example:

Example

A particularly pure sulphur was employed with the following characteristics corresponding to its purity:

| | | | |
|---|---|---|---|
| At 200° C | the melted sulphur contained | 35% by weight | of insoluble sulphur. |
| At 210° C | | 37% by weight | |
| At 218° C | | 42% by weight | |
| At 225° C | | 45% by weight | |

This sulphur was melted in a first container. This container which cannot give off any metal or metal compounds to the sulphur melt consisted of corrosion-resistant steel (chromium-nickel-steel). In order to prevent the formation of sulphur dioxide ($SO_2$), the container was filled with nitrogen above the sulphur melt. The sulphur melt was without the addition of a catalyst heated up to 218° C. At this temperature, the melt contained 42% by weight of insoluble sulphur. This sulphur melt was placed into a second container which likewise consisted of corrosion-resistant steel. To the melt in said second container there was added a halogen-sulphur compound as inhibitor. This inhibitor consisted of approximately 0.7% by weight of sulphur dichloride ($S_2Cl_2$) and was quickly stirred together with the melt. After the melt with the inhibitor had remained approximately one-half minute only in said second container, the melt with the inhibitor was removed from said second container and was suddenly cooled in a water bath below its melting temperature. The cooled-off plastic sulphur had a temperature of 20° C. It was then stored for fourteen days at a temperature of 20° C. The sulphur was then extracted at a temperature of 20° C. while using carbon disulphide as solvent, until the soluble sulphur was completely removed. The extraction residue was freed from solvent residues. To this end, warm water of approximately 60° C. was introduced into the extractor through the bottom thereof which water heated up the extraction residue in the extractor to approximately 45° C. After the water level had risen above the extraction residue, the water was withdrawn again. Thereupon the extraction residue was dried at a temperature of approximately 20° C. The thus obtained sulphur had a high content of over 95% by weight of insoluble sulphur with the extraordinary purity of more than 99% by weight and with high storability.

It is, of course, understood that the present invention is, by no means, limited to the specific method described herein but also comprises any modifications within the scope of the appended claims.

What I claim is:

1. A method of making stabilized insoluble sulphur, which includes the steps of: heating sulphur to a temperature above its melting temperature and below its volatilization temperature without the addition of a catalyst while carrying out the thus effected melting operation in a first vessel of corrosion-resistant material, transferring the thus obtained sulphur melt into a second vessel of corrosion-resistant material, adding an inhibitor to the sulphur melt in said second vessel for preventing a reversion of the insoluble sulphur to soluble sulphur while allowing the sulphur melt and inhibitor to remain in said second vessel for a short time only of the order of from 20 seconds to 10 minutes, after said short time chilling the melt to a temperature below the melting temperature of the sulphur, storing the chilled resultant plastic sulphur until its plastic mass has crystallized, thereafter by means of a solvent extracting the soluble sulphur from the crystallized mass, and separating from said solvent the insoluble sulphur forming the residue.

2. A method according to claim 1, which includes the step of adjusting the melt to a content of from 35 to 45% by weight of insoluble sulphur.

3. A method according to claim 1, which includes the step of adjusting the melt to a content of from 37 to 42% by weight of insoluble sulphur.

4. A method according to claim 1, in which the heating of the sulphur is effected in an atmosphere of inert gases.

5. A method according to claim 1, in which the heating of the sulphur is effected in an atmosphere of carbon dioxide.

6. A method according to claim 1, in which the heating of the sulphur is effected in an atmosphere of nitrogen.

7. A method of making stabilized insoluble sulphur, which includes the steps of: melting the sulphur to be processed without the addition of a catalyst while carrying out said melting in a first vessel of corrosion-resistant material, transferring the thus obtained sulphur melt into a second vessel of corrosion-resistant material, adding an inhibitor to the sulphur melt in said vessel for preventing a reversion of the insoluble sulphur to soluble sulphur while allowing the sulphur melt and inhibitor to remain in said second vessel for a short time only of the order of from 20 seconds to 10 minutes, after said short time chilling the melt to a temperature below the melting temperature of the sulphur, storing the chilled resultant plastic sulphur until its plastic mass has crystallized, thereafter by means of a solvent extracting the soluble sulphur from the crystallized mass, separating from said solvent the insoluble sulphur forming the residue by gradually flooding the residue with warm water of a temperature of less than 60° C. from below until the water level has risen above the surface of said residue, and subsequently releasing the water from said residue.

References Cited in the file of this patent

UNITED STATES PATENTS

| 2,419,310 | Belchetz | Apr. 22, 1947 |
| 2,419,324 | Missbach | Apr. 22, 1947 |
| 2,569,375 | Grove | Sept. 25, 1951 |